(12) United States Patent
Chenoweth et al.

(10) Patent No.: US 10,317,001 B2
(45) Date of Patent: Jun. 11, 2019

(54) AXIAL SWAGED FITTING

(71) Applicant: TYLOK INTERNATIONAL, INC., Cleveland, OH (US)

(72) Inventors: Jeffery J. Chenoweth, Chardon, OH (US); Vincent P. Traina, Painesville, OH (US); Keith D. Kainec, Sagamore Hills, OH (US); Donald A. Levengood, Chagrin Falls, OH (US); Charles W. Hahl, Novelty, OH (US)

(73) Assignee: TYLOK INTERNATIONAL, INC., Cleveland, OH (US)

( * ) Notice: Subject to any disclaimer, the term of this patent is extended or adjusted under 35 U.S.C. 154(b) by 136 days.

(21) Appl. No.: 15/459,571

(22) Filed: Mar. 15, 2017

(65) Prior Publication Data

US 2018/0266599 A1 Sep. 20, 2018

(51) Int. Cl.
*F16L 33/32* (2006.01)
*F16L 33/26* (2006.01)
*F16L 37/23* (2006.01)
*F16L 19/08* (2006.01)

(52) U.S. Cl.
CPC .............. *F16L 33/32* (2013.01); *F16L 33/26* (2013.01); *F16L 37/23* (2013.01); *F16L 19/08* (2013.01)

(58) Field of Classification Search
CPC ........ F16L 13/14; F16L 13/146; F16L 13/165
USPC .................. 285/81, 382, 382.1, 382.2, 382.7
See application file for complete search history.

(56) References Cited

U.S. PATENT DOCUMENTS

| 1,700,195 | A |   | 1/1929  | Cox |
|-----------|---|---|---------|-----|
| 2,219,053 | A | * | 10/1940 | Osborn .................... F16L 19/00 |
|           |   |   |         | 285/343 |
| 2,310,744 | A | * | 2/1943  | Osborn .................... F16L 19/06 |
|           |   |   |         | 285/322 |
| 2,484,815 | A |   | 10/1949 | Crawford |
| 2,761,704 | A |   | 1/1952  | Crawford |
| 2,648,111 | A | * | 8/1953  | Wengen .................. F16G 11/06 |
|           |   |   |         | 24/335 |
| 3,069,188 | A |   | 1/1961  | Crawford |

(Continued)

FOREIGN PATENT DOCUMENTS

| GB | 444002   | 9/1935  |
| GB | 2145491  | 3/1985  |
| KR | 101196433 | 11/2012 |

*Primary Examiner* — Aaron M Dunwoody
(74) *Attorney, Agent, or Firm* — Tarolli, Sundheim, Covell & Tummino LLP

(57) ABSTRACT

An axial swaged fitting for permanently joining to a tube to achieve an elastic strain preload condition comprises an annular body including at least one body compression ball cavity. The body laterally surrounds at least a portion of the tube. An annular retainer includes at least one retainer compression ball cavity. The retainer laterally surrounds at least a portion of the body. A compression ball is located concurrently in both of the body compression ball cavity and the retainer compression ball cavity. The compression ball is deformed into both the body and the retainer. An annular collar laterally surrounds at least a portion of the retainer. The collar selectively exerts a predetermined compression force laterally inward toward the tube to urge the at least one compression ball into a deformation contact with at least one of the body compression ball cavity and the retainer compression ball cavity into the elastic strain preload condition.

20 Claims, 12 Drawing Sheets

(56) References Cited

U.S. PATENT DOCUMENTS

| | | | |
|---|---|---|---|
| 3,103,373 | A | 9/1963 | Lennon et al. |
| 3,112,940 | A | 12/1963 | Crawford |
| 3,584,900 | A | 6/1971 | Lennon et al. |
| 3,736,008 | A | 5/1973 | Crawford |
| 4,223,919 | A * | 9/1980 | Kurachi ............... F16L 19/065 |
| | | | 285/248 |
| 4,516,796 | A | 5/1985 | Hudson |
| 4,826,218 | A | 5/1989 | Zahuranec |
| 4,915,427 | A | 4/1990 | Zahuranec |
| 5,074,599 | A | 12/1991 | Wirbel et al. |
| 5,308,122 | A | 5/1994 | Crawford et al. |
| 5,405,176 | A | 4/1995 | Babel et al. |
| 5,907,966 | A | 6/1999 | Moore |
| 6,093,303 | A | 7/2000 | Williams et al. |
| 6,131,956 | A | 10/2000 | Foering et al. |
| 6,206,432 | B1 | 3/2001 | Kamiyama |
| 6,345,845 | B2 | 2/2002 | Johnston |
| 6,390,720 | B1 | 5/2002 | Lebegue et al. |
| 6,450,553 | B1 | 9/2002 | Suresh |
| 6,474,701 | B1 | 11/2002 | Bowles et al. |
| 6,851,729 | B2 | 2/2005 | Gibson |
| 1,010,954 | A1 | 12/2005 | Rasmussen et al. |
| 7,100,949 | B2 | 9/2006 | Williams et al. |
| 7,300,076 | B2 * | 11/2007 | Inoue ................... F16L 33/222 |
| | | | 285/248 |
| 7,367,595 | B2 | 5/2008 | Williams et al. |
| 7,900,976 | B2 | 3/2011 | Kainec |
| 8,006,367 | B1 | 8/2011 | Best |
| 8,246,085 | B2 | 8/2012 | Kitagawa |
| 8,608,210 | B2 | 12/2013 | Kainec |
| 8,997,325 | B2 | 4/2015 | Williams et al. |
| 9,033,373 | B2 | 5/2015 | Irwin et al. |
| 2002/0073523 | A1 | 6/2002 | Feher |
| 2005/0146133 | A1 | 7/2005 | Snyder, Sr. et al. |
| 2005/0253380 | A1 | 11/2005 | Gibb et al. |
| 2005/0253383 | A1 | 11/2005 | Gibb et al. |
| 2006/0103136 | A1 | 5/2006 | Krengel et al. |
| 2008/0001401 | A1 | 1/2008 | Quesada et al. |
| 2010/0171309 | A1 | 7/2010 | Kainec |
| 2010/0201123 | A1 | 8/2010 | Kitagawa |
| 2010/0289256 | A1 | 11/2010 | Shumard |
| 2011/0089687 | A1 | 4/2011 | Goemans et al. |
| 2015/0316185 | A1 | 11/2015 | Mullin |

* cited by examiner

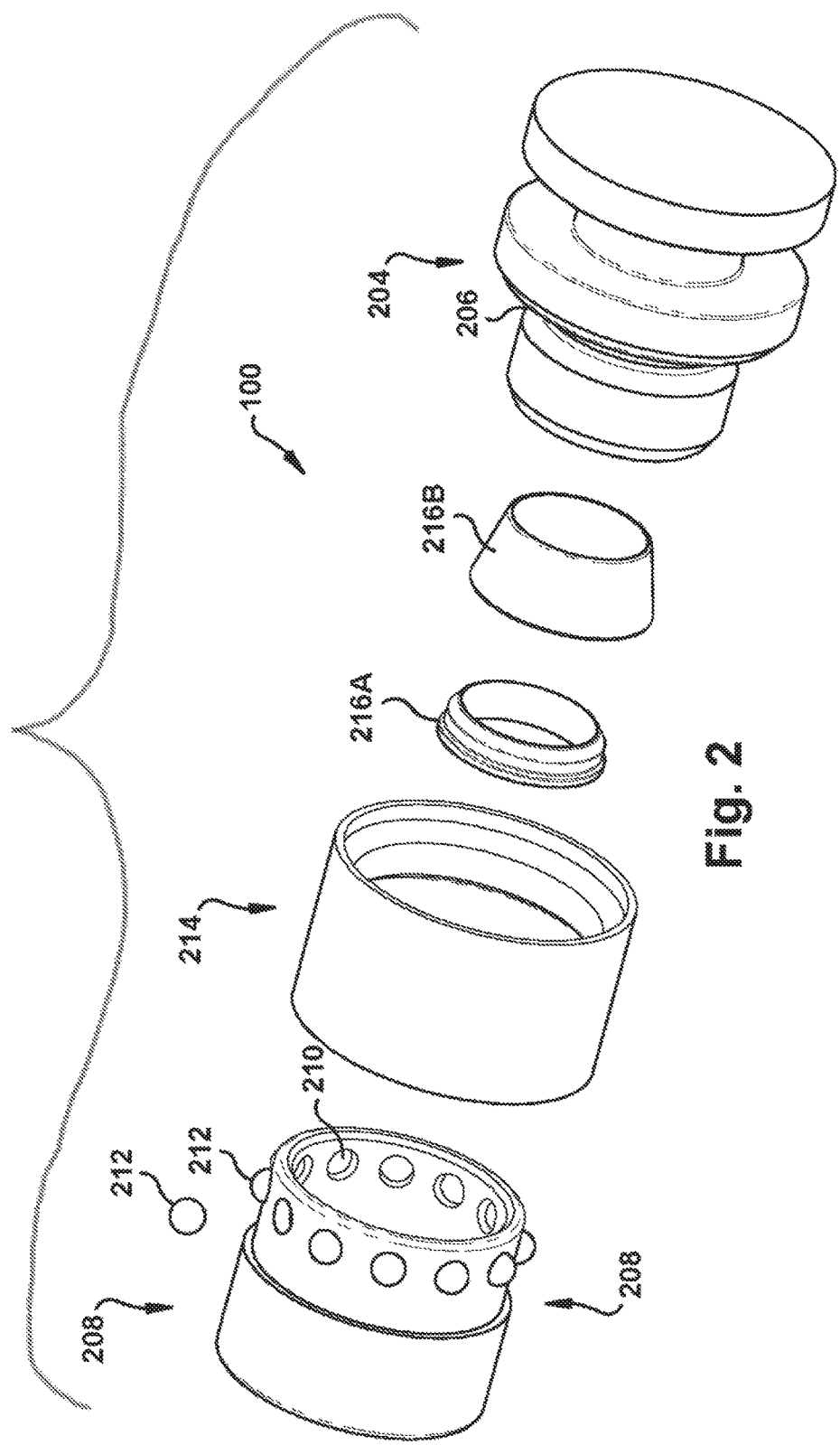

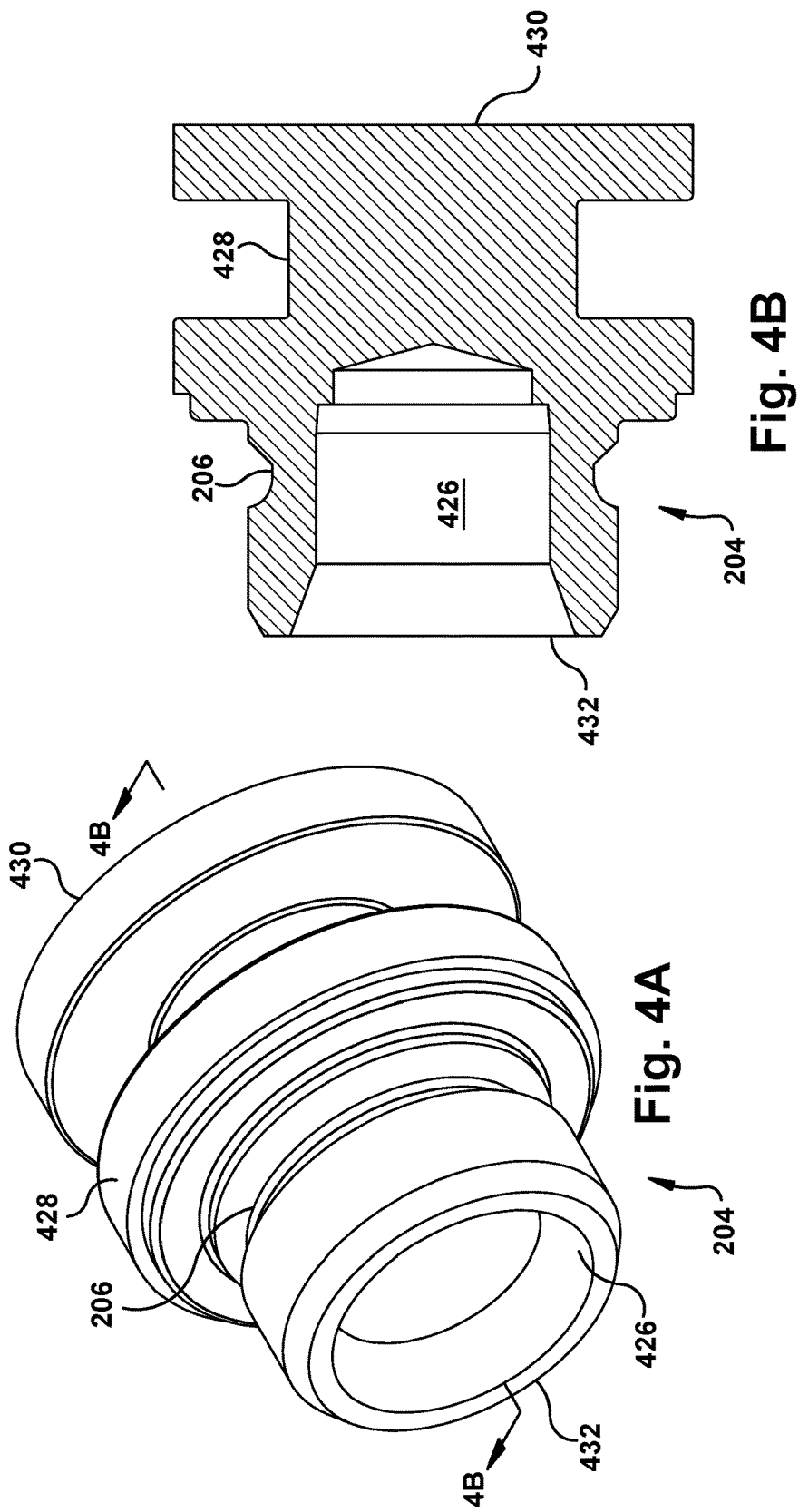

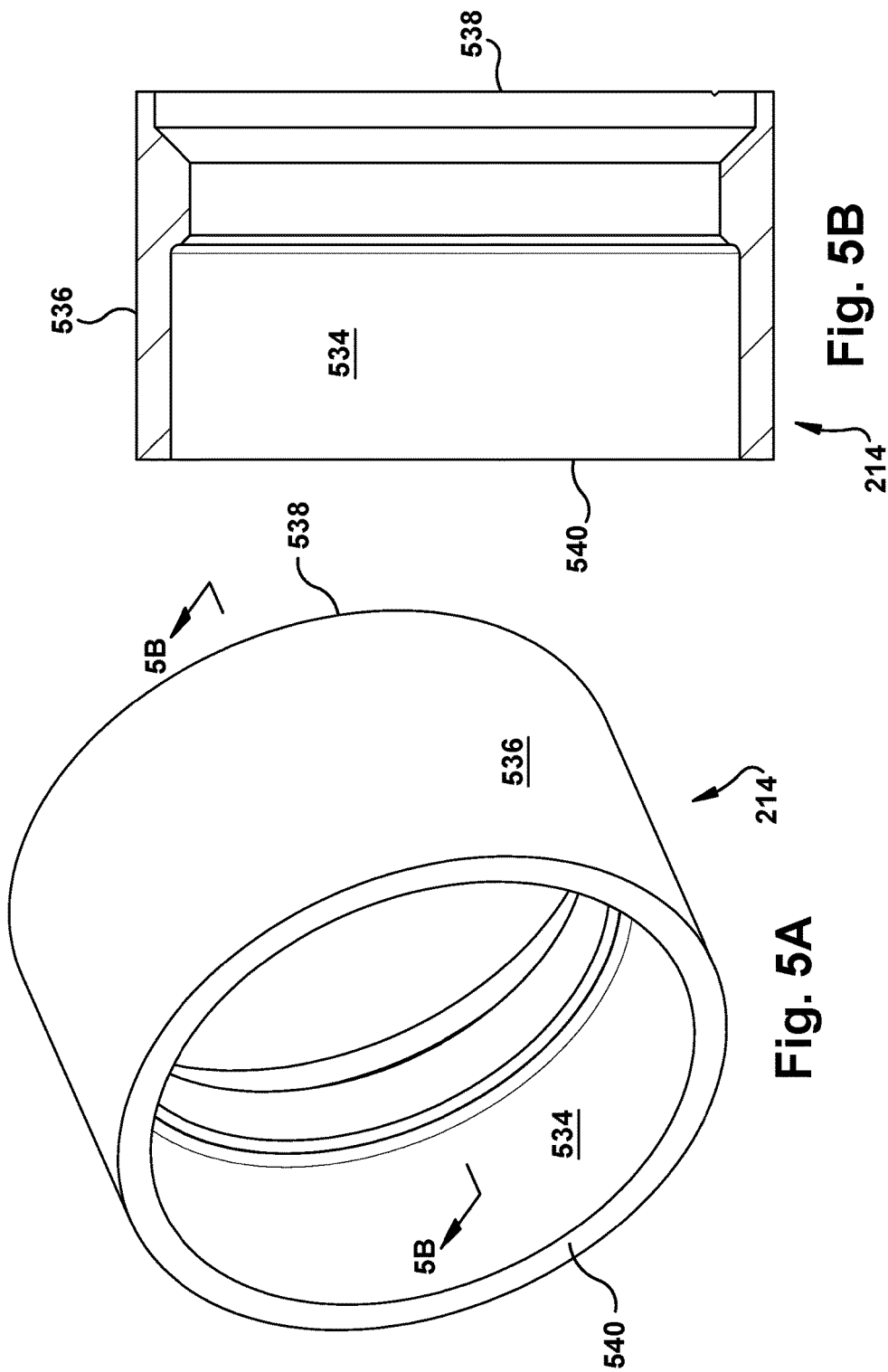

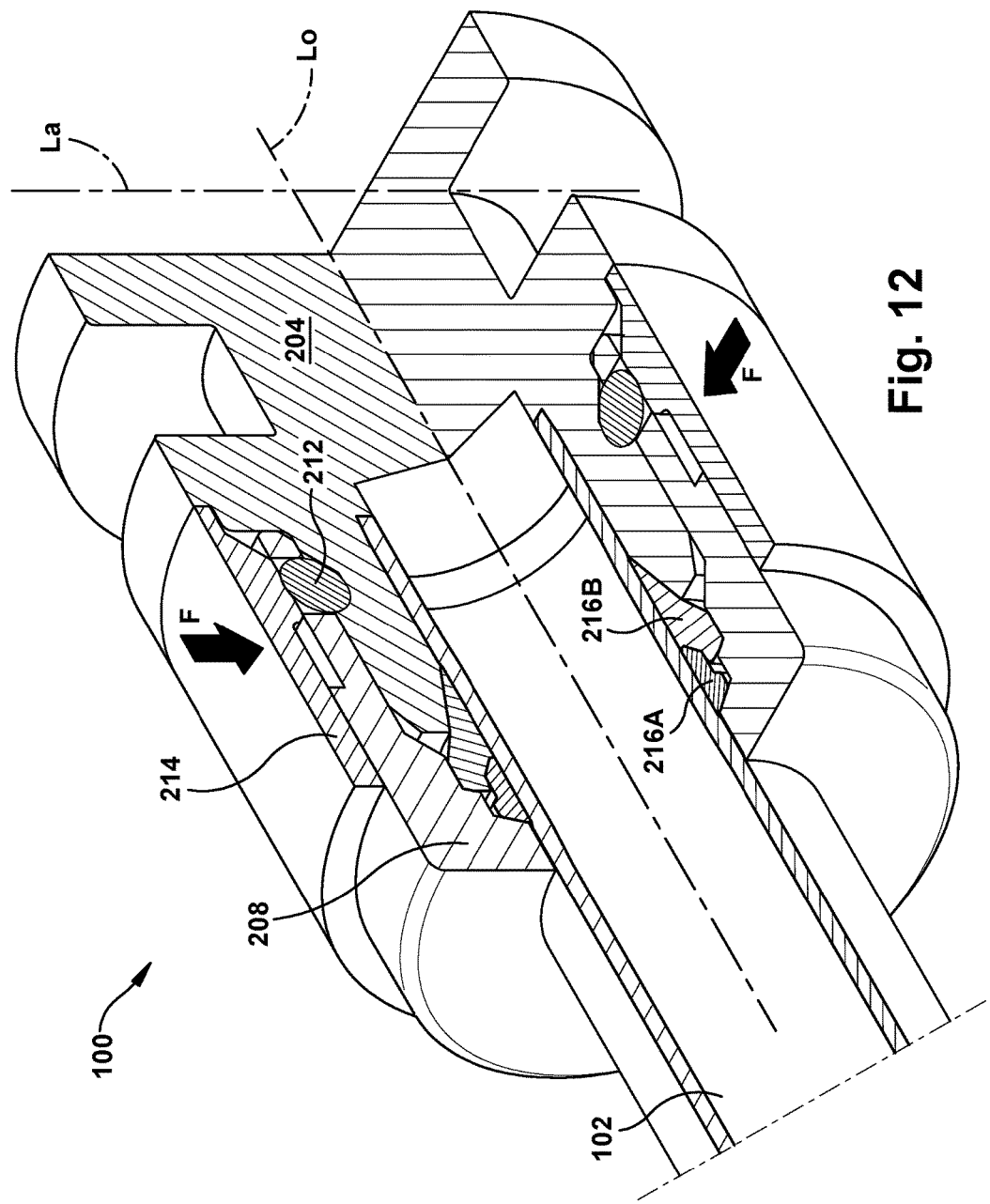

AXIAL SWAGED FITTING

TECHNICAL FIELD

This disclosure relates to an apparatus and method for use of an axial swaged fitting and, more particularly, to an axial swaged fitting for permanently joining to a tube to achieve an elastic strain preload condition.

BACKGROUND

Permanent fittings are commonly used for connecting metal tubes, conduits, and pipes to each other for use in a variety of applications, for example for the conveyance of gasses, liquids, or other fluids in the medical, aerospace, automotive or other vehicle, construction, or many other industries. It is desirable for the connection between the tubes and fitting to be secure in order to withstand vibrations and adverse conditions.

SUMMARY

In an aspect, an axial swaged fitting for permanently joining to a tube to achieve an elastic strain preload condition is described. The fitting comprises an annular body including at least one body compression ball cavity. The body laterally surrounds at least a portion of the tube. An annular retainer includes at least one retainer compression ball cavity. The retainer laterally surrounds at least a portion of the body. At least one compression ball is located concurrently in both of the body compression ball cavity and the retainer compression ball cavity. The compression ball is deformed into both the body and the retainer. An annular collar laterally surrounds at least a portion of the retainer. The collar selectively exerts a predetermined compression force laterally inward toward the tube to deform the at least one compression ball into at least one of the body compression ball cavity and the retainer compression ball cavity into the elastic strain preload condition.

In an aspect, an axial swaged fitting for permanently joining to a tube is described. The fitting comprises a body including laterally spaced, concentrically extending, and oppositely facing inner body and outer body surfaces. The outer body surface includes at least one body compression ball cavity. The inner body surface is for contacting an outer tube surface of the tube. A retainer includes laterally spaced, concentrically extending, and oppositely facing inner retainer and outer retainer surfaces. The inner retainer surface includes at least one retainer compression ball cavity. The inner retainer surface is for contacting the outer body surface. At least one compression ball is for location concurrently in both of the body compression ball cavity and the retainer compression ball cavity. A collar includes laterally spaced, concentrically extending, and oppositely facing inner collar and outer collar surfaces. The inner collar surface is for contacting the outer retainer surface. The collar selectively exerts a predetermined compression force laterally inward toward the outer tube surface. The predetermined compression force deforms the at least one compression ball into at least one of the body compression ball cavity and the retainer compression ball cavity.

In an aspect, a method of permanently joining an axial swaged fitting to a tube to achieve an elastic strain preload condition is described. A portion of the tube is laterally surrounded with an annular body including at least one body compression ball cavity. At least a portion of the body is laterally surrounded with an annular retainer including at least one retainer compression ball cavity. The body and retainer are brought into at least partial lateral contact. A compression ball is located concurrently in both the body compression ball cavity and the retainer compression ball cavity. An annular collar is provided. The collar is brought into at least partial lateral contact with the retainer. The collar is slid axially along the retainer. With the collar, a predetermined compression force is exerted laterally inward toward the outer tube surface. With the predetermined compression force, the at least one compression ball is deformed into at least one of the body compression ball cavity and the retainer compression ball cavity to achieve the elastic strain preload condition.

BRIEF DESCRIPTION OF THE DRAWINGS

For a better understanding, reference may be made to the accompanying drawings, in which:

FIG. 2 is an exploded view of the aspect of FIG. 1;

FIG. 4A is a perspective side view of a component of the aspect of FIG. 1;

FIG. 4B is a cross-sectional view taken along line 4B-4B of FIG. 4A;

FIG. 5A is a perspective side view of a component of the aspect of FIG. 1;

FIG. 5B is a cross-sectional view taken along line 5B-5B of FIG. 5A; and

FIGS. 6-12 schematically cross-sectionally depict a sequence of installation of the aspect of FIG. 1.

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
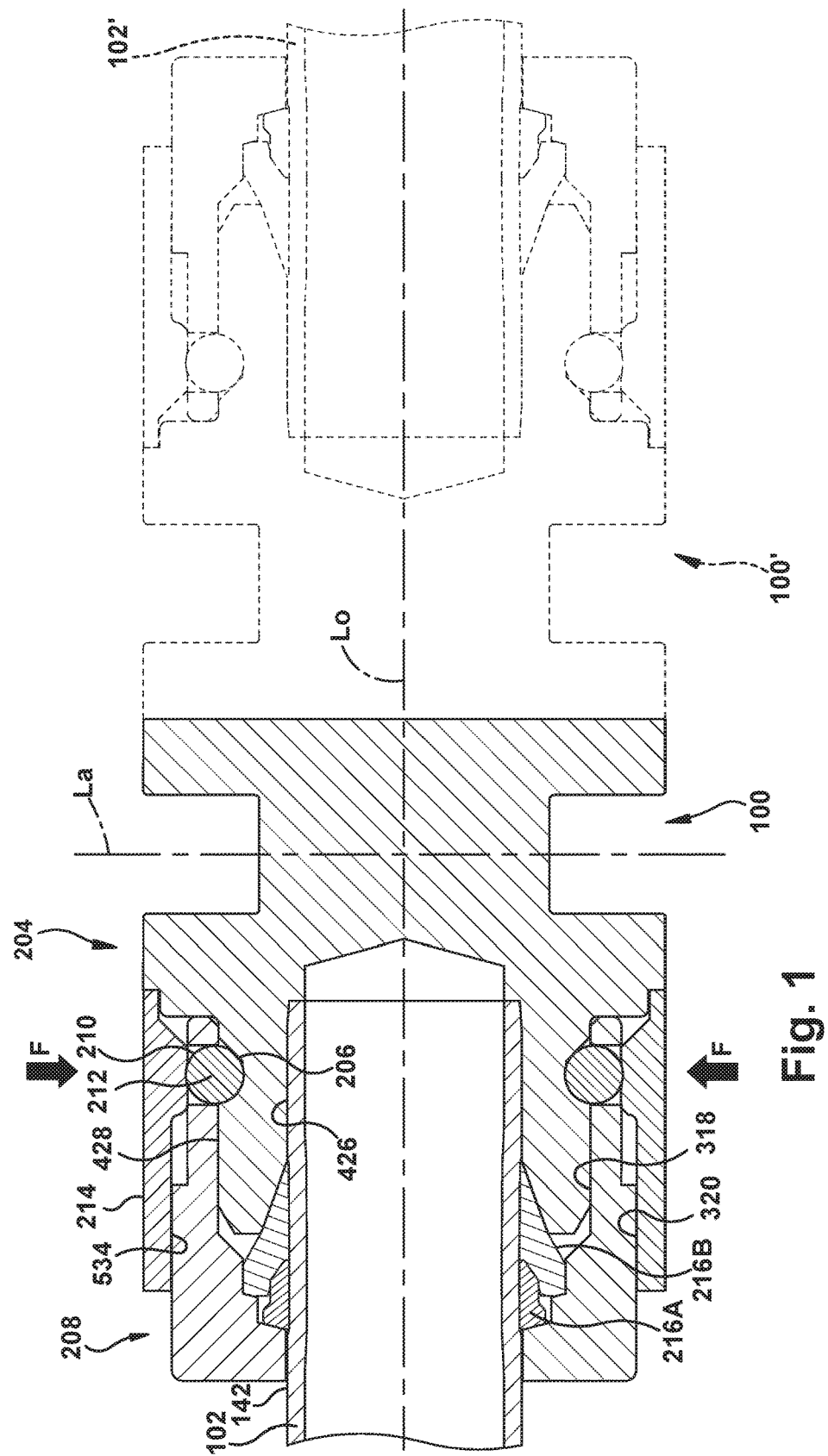
FIG. 1 is a schematic cross-sectional view of an aspect of the present invention.

FIG. 1 depicts an axial swaged fitting 100 for permanently joining to a tube 102 to achieve an elastic strain preload condition. As shown in the exploded view of FIG. 2, the fitting 100 includes an annular body 204 including at least one body compression ball cavity 206 (shown here as an annular groove encircling an outer diameter of the body 204). The body 204 laterally surrounds at least a portion of the tube 102, as shown in FIG. 1. The "lateral" direction is substantially parallel to lateral line "La" in FIG. 1—i.e., is substantially vertical, in the orientation of FIG. 1.

An annular retainer 208 includes at least one retainer compression ball cavity 210. The retainer 208 laterally surrounds at least a portion of the body 204.

At least one compression ball 212 (one shown exploded away from the retainer 208 in FIG. 2) is located concurrently in both of the body compression ball cavity 206 and the retainer compression ball cavity 210, when the fitting 100 is in a use configuration. Once the fitting 100 is fully assembled for use, at least one of the compression balls 212 may be deformed into both the body 204 and the retainer 208. The compression balls 212 may be similar or the same, or one or more of the compression balls 212 may have different physical characteristics from at least one other compression ball 212. Each compression ball 212 can be at least one of a ball (e.g., a ball bearing), a rolling member, any translatable member, any other appropriate small structure, or any combination thereof.

An annular collar 214 laterally surrounds at least a portion of the retainer 208. The collar 214 selectively exerts a predetermined compression force (shown schematically as "F", in the Figures) laterally inward toward the tube 102, when the fitting 100 is in an assembled, use configuration, to urge the at least one compression ball 212 into a deformation contact with at least one of the body compression ball cavity 206 and the retainer compression ball cavity 210. The term "deform" is used herein to generally reference all of plastic, elastic, and combination plastic/elastic deformation, unless clearly restricted to one of those for that instance of use of the term. A "deformation contact" is one in which at least one of the contacting structures is deformed by contact with the other(s).

The collar 214 will be described herein as deforming at least one of the body 204 and the retainer 208, under force transmitted through/via the at least one compression ball 212. It is contemplated that the collar 214 may also or instead deform at least one compression ball 212 under force transmitted through/via at least one of the body 204 and the retainer 212. Both of these situations (deformed body 204 and/or retainer 208, and deformed ball(s) 212) can be considered deformation contacts. The predetermined compression force F may deform at least one of: the compression ball(s) 212, the body compression ball cavity 206, the retainer compression ball cavity 210, or any other structures of the fitting 100 or tube 102. A desired configuration of deformations and relative contacting forces between/among these and other structures of the fitting 100 could be provided by one of ordinary skill in the art for a particular use environment, such as by choosing materials for the fitting 100 structures having particular hardnesses or other physical properties.

At least one annular ring 216A and/or 216B may be located laterally between the tube 102 and at least one of the body 204 and the retainer 208. (Two rings, 216A and 216B, are shown in the Figures, but will be collectively referenced as "216A and/or 216B" for the sake of this description.) When present, each ring 216A and/or 216B may be deformed into the tube 102 under the predetermined compression force F. The tube 102 may deform under laterally oriented force applied by the ring(s) 216A and/or 216B; such "squeezing" compression of a tube 102 during engagement of a fitting may assist with sealing the fitting against an outer surface of the tube. However, a "squeeze" may be optional during assembly and/or installation of the fitting 100.

As shown in FIG. 1, the body 204, retainer 208, collar 214, ring(s) 216A and/or 216B (when present), and tube 102 may be arranged concentrically around a common longitudinal axis ("Lo", as depicted). The "longitudinal" direction, as described and used herein, is substantially perpendicular to the lateral direction.

The at least one compression ball 212 may be made of a first material, such as, but not limited to, stainless steel (including 440C hardened stainless steel). The body 204 and retainer 208 may be made of a second material, such as, but not limited to, brass (including C27450 brass). The first material may be harder than the second material, such that the compression balls 212 will "dig into" at least one of the body 204 and retainer 208 under the predetermined compression force F. Similarly, the collar 214 may be made of a third material (which could, in some use environments, be the same as the first material). The third material may be harder than the second material, so that the collar 214 is strong enough to compress some combination of the compression balls 212, the body 204, and the retainer 208 and thus exert the predetermined compressive force F against other structures of the fitting 100 during manufacture and/or installation thereof, to ultimately achieve a "finished" or use configuration. At least one compression ball 212 may be configured for location concurrently in both of the body compression ball cavity 206 and the retainer compression ball cavity 210.

Figure 3B:
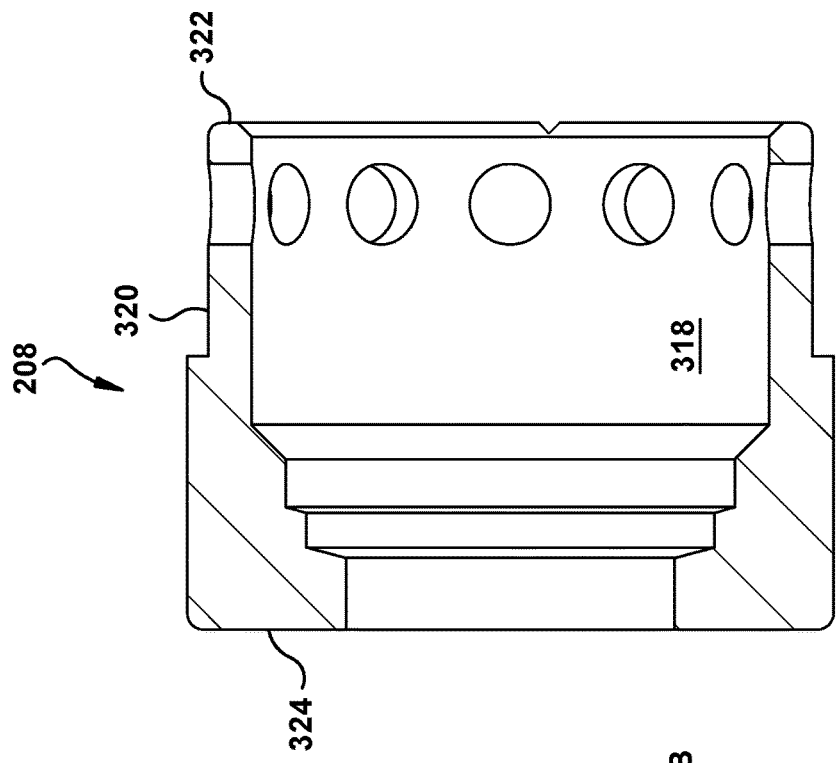
FIG. 3B is a cross-sectional view taken along line 3B-3B of FIG. 3A.
Figure 3A:
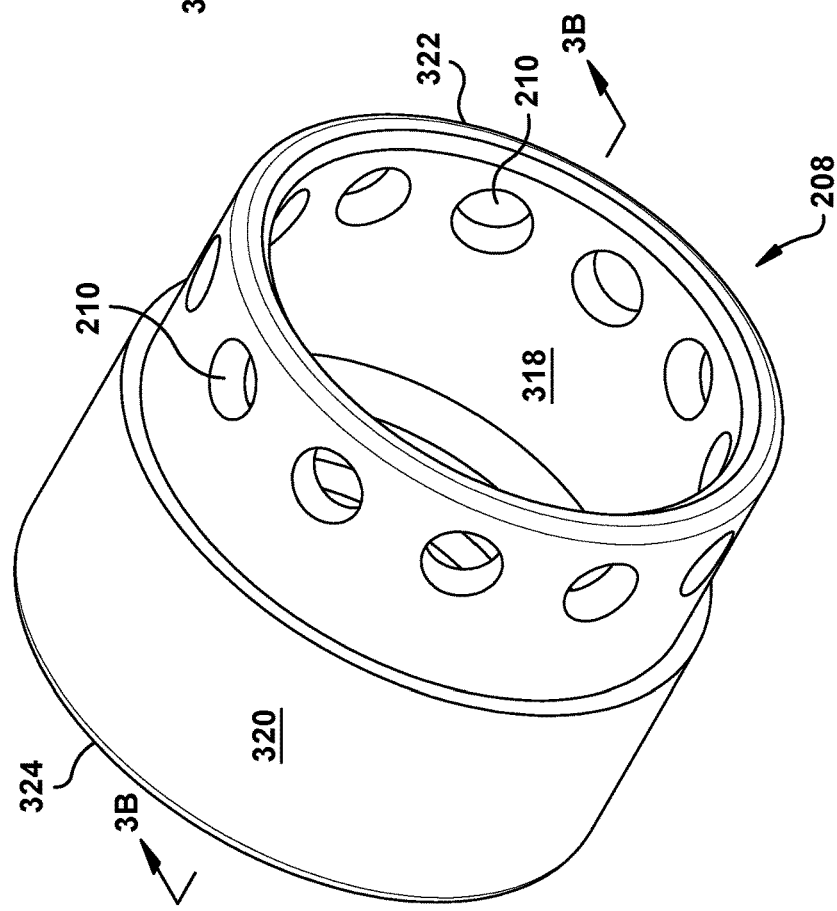
FIG. 3A is a perspective side view of a component of the aspect of FIG. 1.

The retainer 208 is shown in perspective view in FIG. 3A and in cross-sectional view in FIG. 3B. The retainer 208 includes laterally spaced, concentrically extending, and oppositely facing inner retainer and outer retainer surfaces 318 and 320, respectively. The retainer 208 may also include longitudinally spaced front and rear retainer rims 322 and 324, respectively. The inner and/or outer retainer surfaces 318 and 320 may be contoured or stepped, as shown, to interact with other structures of the fitting 100, to assist with manufacturing, or for any desired reason. At least the inner retainer surface 318 may include the at least one retainer compression ball cavity 210. As shown in the Figures, a plurality of retainer compression ball cavities 210 may be radially spaced—and may be arranged in a rotationally symmetrical array—within a selected lateral cross-section (i.e., a cross-section taken across a particular lateral plane) of the retainer 208. The retainer compression ball cavities 210 may be operative to at least partially contain, and may guide motion of, a compression ball 212 during assembly/manufacture and use of the fitting 100.

The body 204 is shown in perspective view in FIG. 4A and in cross-sectional view in FIG. 4B. The body 204 includes laterally spaced, concentrically extending, and oppositely facing inner body and outer body surfaces, 426 and 428, respectively. The body 204 may also include longitudinally spaced front and rear body rims 430 and 432, respectively. The inner and/or outer body surfaces 426 and 428 may be contoured or stepped, as shown, to interact with other structures of the fitting 100, to assist with manufacturing, or for any desired reason. The front body rim 430 is shown in the Figures as a "blind cap", for clarity of depiction, but could instead take any desired configuration, with one example discussed in detail further below.

The outer body surface 428 includes at least one body compression ball cavity 206. The body compression ball cavity 206 is shown in the Figures as being a single annular groove, which may be helpful in easily bringing the compression balls 212, retainer compression ball cavities 210, and body compression ball cavity/ies 206 into alignment without requiring exact registration of the retainer compression ball cavities 210 with a plurality of discrete body compression ball cavities 206. The single body compression ball cavity 206 shown may also provide manufacturing efficiencies and cost savings over a plurality of individual and smaller body compression ball cavities (not shown), though one of ordinary skill in the art could configure the fitting 100 with any number and configuration of body compression ball cavities 206, retainer compression ball cavities 210, or any other features/structures as desired for a particular use environment.

The collar 214 is shown in perspective view in FIG. 5A and in cross-sectional view in FIG. 5B. The collar 214 includes laterally spaced, concentrically extending, and oppositely facing inner collar and outer collar surfaces, 534 and 536, respectively. The collar 214 may also include longitudinally spaced front and rear collar rims 538 and 540, respectively. The inner and/or outer collar surfaces 534 and 536 may be contoured or stepped, as shown, to interact with other structures of the fitting 100, to assist with manufacturing, or for any desired reason. For many use environments of the fitting 100, for example, it may be desirable for the components to be relatively configured such that the outer collar surface 536 is substantially flush and contiguous with a laterally outermost portion of the outer body surface 428.

With reference back to FIG. 1, when the fitting 100 is in an "assembled" or use configuration, the inner collar surface 534 contacts the outer retainer surface 320. The inner body surface 426 contacts an outer tube surface 142 of the tube 102. The inner retainer surface 318 contacts the outer body surface 428. The collar 214 selectively exerts the predetermined compression force F laterally inward toward the outer tube surface 142. The predetermined compression force F may deform the at least one compression ball 212 into at least one of the body compression ball cavity 206 and the retainer compression ball cavity 210.

As shown in the Figures, it is contemplated that none of the body 204, retainer 208, and collar 214 may include screw threads (to assist with makeup of the fitting 100) for many use environments of the fitting 100. As a result, the assembly of the fitting 100 may be done in a purely sliding, such as substantially axially sliding, manner, as will be described below, rather than via a threaded or rotational connection. This lack of screw threads may assist with reducing manufacturing time and costs, and may also be helpful in forming desired swaging relationships using the fitting 100 (including components thereof) and the tube 102.

Figure 6:
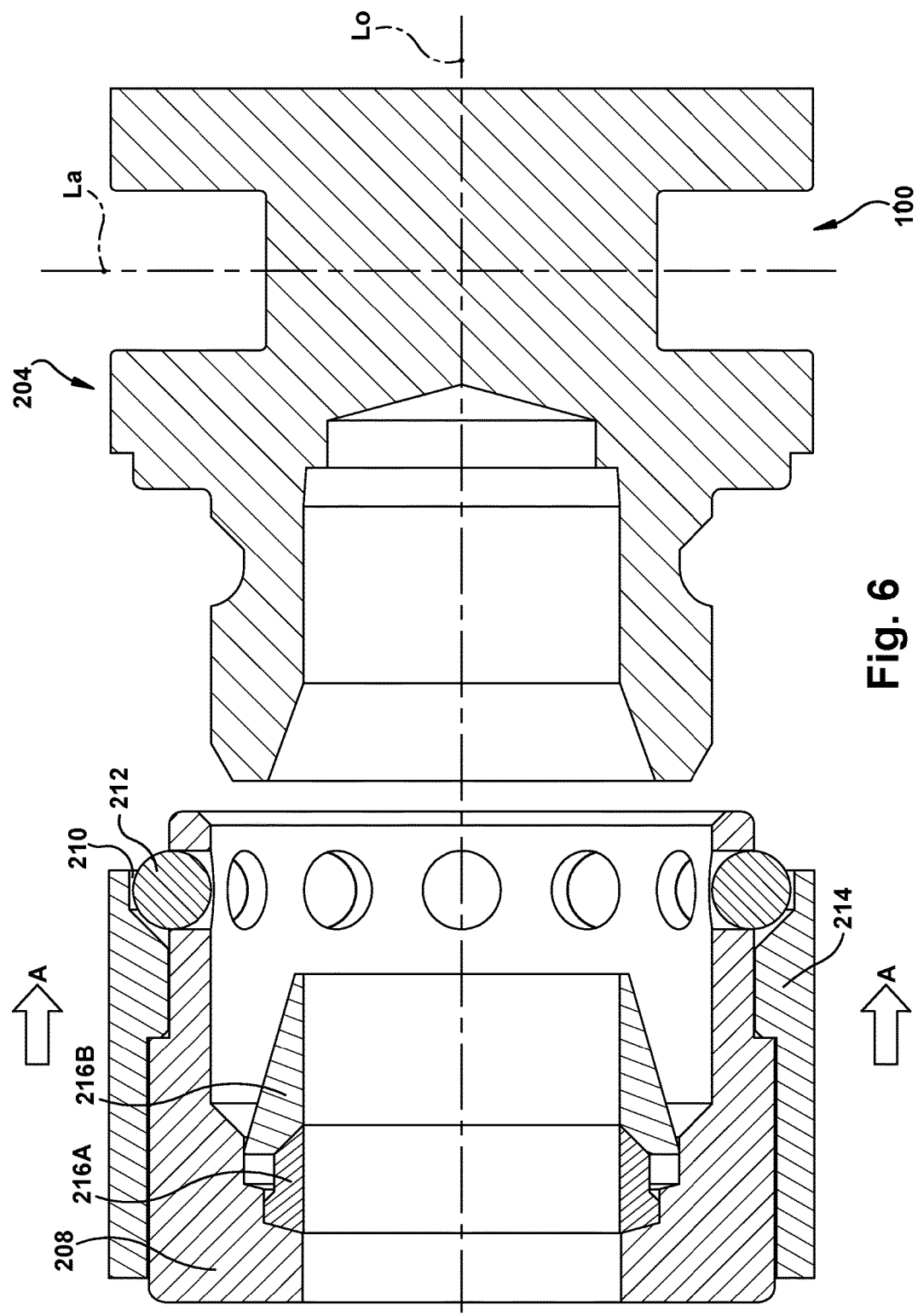

Turning now to the sequence of FIGS. 6-12, a method of permanently joining an axial swaged fitting 100 to a tube 102 to achieve an elastic strain preload condition will be described. While certain structures of the fitting 100 are shown in FIGS. 6-12 as being associated with each other in various preassembly and assembly stages, it is contemplated that the various parts of the fitting 100 could be conglomerated in any desired combinations and sequences. For example, certain combinations of components could be preassembled together by a manufacturer, with the final assembly of the fitting 100 onto a tube 102 occurring in the field by a user FIG. 6 depicts an early stage in the assembly of the fitting 100. A compression ball 212 is located concurrently in both the body compression ball cavity 206 and the retainer compression ball cavity 210. Optionally a locating ring (not shown) having at least one locating compression ball cavity could be provided to maintain the compression balls 212 in the desired locations during the assembly process. When present, the locating ring could be a removable fixture which is not present in the finally assembled fitting 100. The locating ring could instead be left in the fitting 100, and may act as at least a portion of the body 204 and the retainer 208, in such case. As shown in FIG. 6, there may be a preassembly of the retainer 208, collar 214, any desired rings 216A and/or 216B, and one or more compression balls 212. As mentioned above, this preassembly, when it occurs, may be done at any desired point during the manufacture and assembly of the fitting 100 and is shown here for clarity.

At least one annular ring 216A and/or 216B may be placed laterally between the tube 102 and at least one of the body 204 and the retainer 208. As shown in FIGS. 6-12, the body 204, retainer 208, collar 214, and tube 102 may be arranged concentrically around a common longitudinal axis La.

Figure 7:
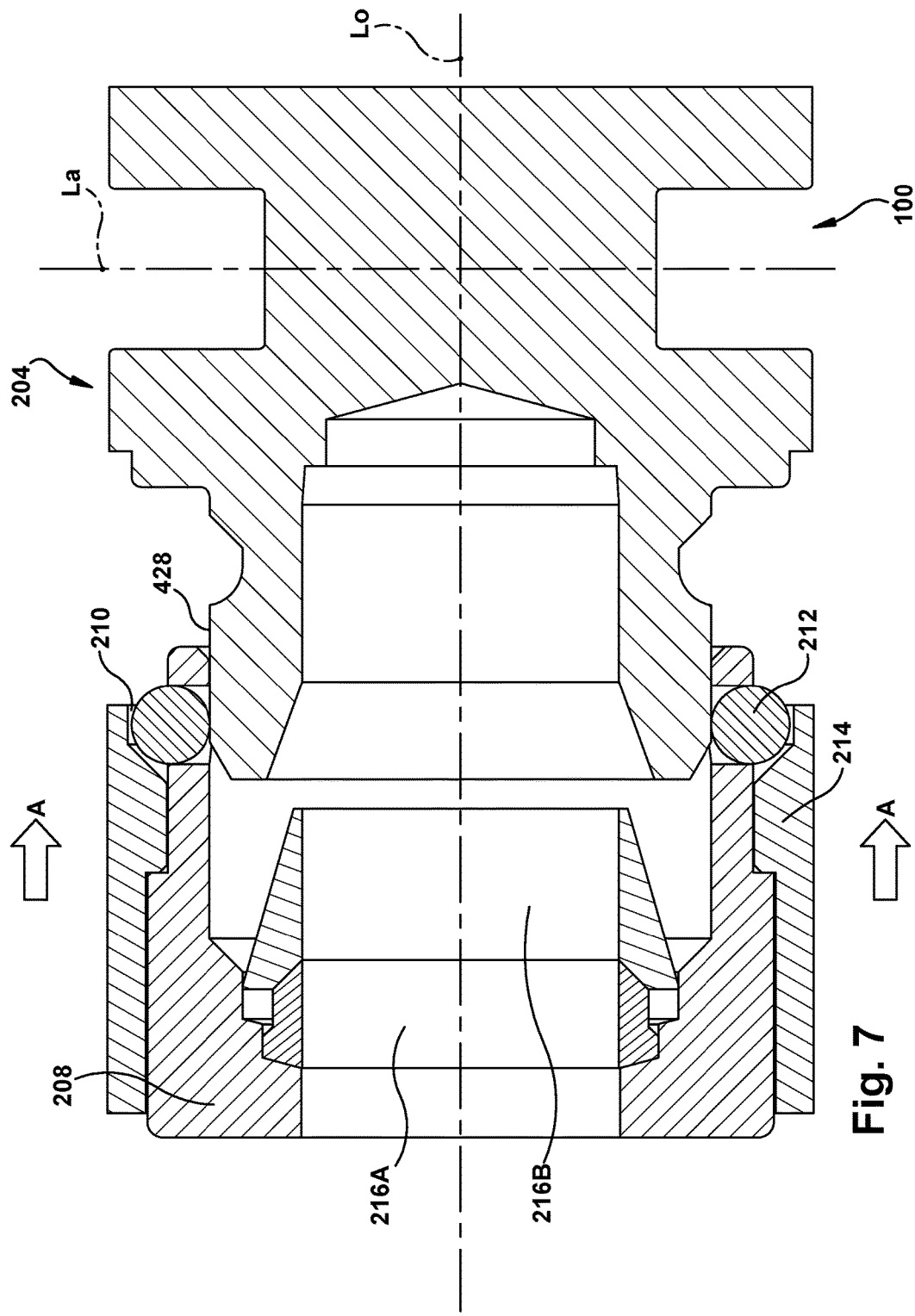
Figure 8:
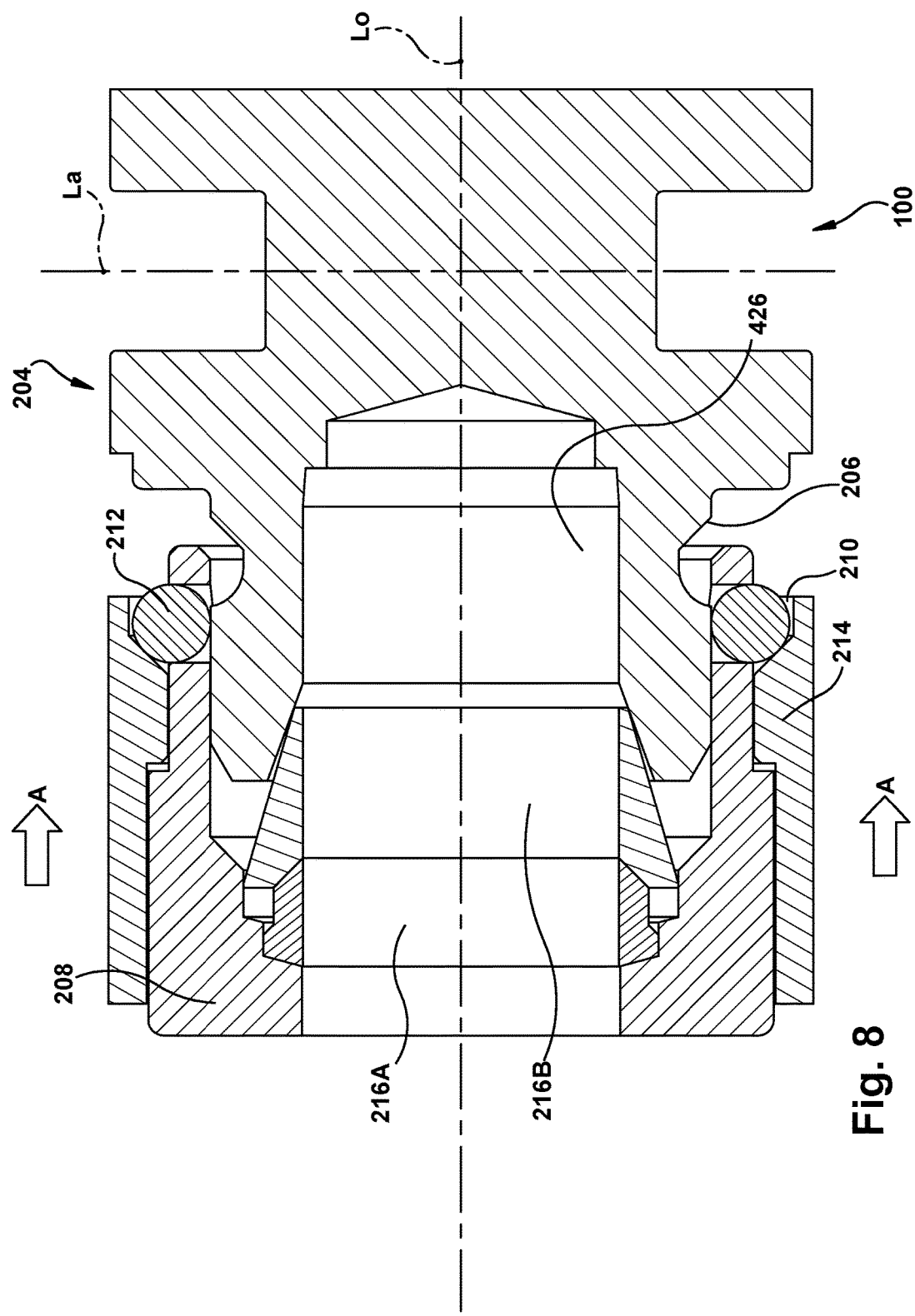

At least a portion of the body 204 is laterally surrounded with an annular retainer 208 including at least one retainer compression ball cavity 210. As shown in FIG. 7, the body 204 and retainer 208 are brought into at least partial lateral contact. The collar 214 may be brought into at least partial lateral contact with the retainer 208, as shown in FIGS. 6-12, such as by sliding the collar 214 axially (in direction "A") along the retainer 208, and more specifically, by sliding the collar 214 axially along the outer retainer surface 320. Any sliding of the collar 214 axially along the retainer 208 may include sliding the collar 214 substantially axially along the retainer 208 with no significant lateral motion of the collar 214 with respect to the retainer 208. Alternatively, some lateral motion (e.g. rotation or "wiggling" around the longitudinal axis Lo) could be present when the collar 214 is slid along the retainer 208.

With reference to FIG. 7, the collar 214, retainer 208, and compression balls 212 are slid along the outer body surface 428, and the compression balls 212 may act in a "ball bearing" manner, rotating within the retainer compression ball cavities 210 to facilitate such sliding. When the fitting 100 achieves the configuration shown in FIG. 8, there may be some degree of laterally inward compressive force present which serves to help maintain the components in the depicted position. This "pre-loading" or "pre-swaging" may be done, for example, at a manufacturing facility (optionally without a tube 102 within the inner body surface 426) in order to provide an easily transported one-piece, partially engaged fitting 100. Alternatively, the entire assembly of the fitting 100 into a use condition could be done wholly in the field or in a manufacturing facility, depending upon the use environment.

Figure 9:
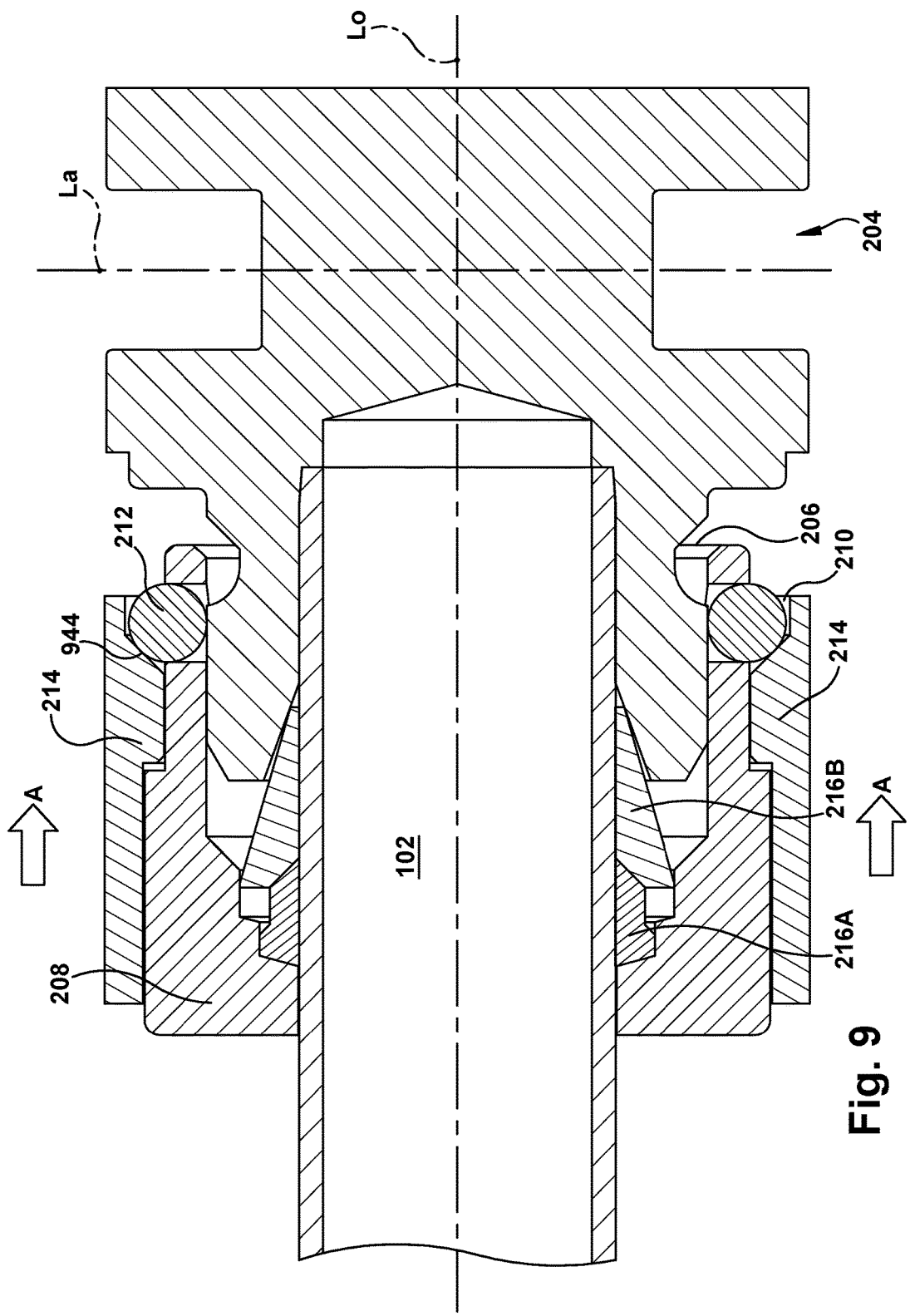

Turning now to FIG. 9, at least a portion of the tube 102 is laterally surrounded with an annular body 204 including at least one body compression ball cavity 206. This occurs concurrently, in the assembly sequence shown in FIGS. 6-12, with at least a portion of the tube 102 being laterally surrounded with the retainer 208 and collar 214. However, as previously noted, this assembly could occur in any desired sequence.

With the collar 214, retainer 208, and compression balls 212 being slid axially (in direction A) along the tube 102 into engagement with the body 204, a predetermined compression force F begins to be exerted laterally inward toward the outer tube surface 142. This action occurs during the "installation" transition from the preliminary or assembly configuration of FIGS. 6-8 and occurs through to the finished or use configuration of FIG. 12. As mentioned above, the compression balls 212 may rotate within the body and/or retainer compression ball cavities 206 and 210 at any time during assembly of the fitting 100 to reduce frictional forces on the sliding collar 214.

Figure 10:
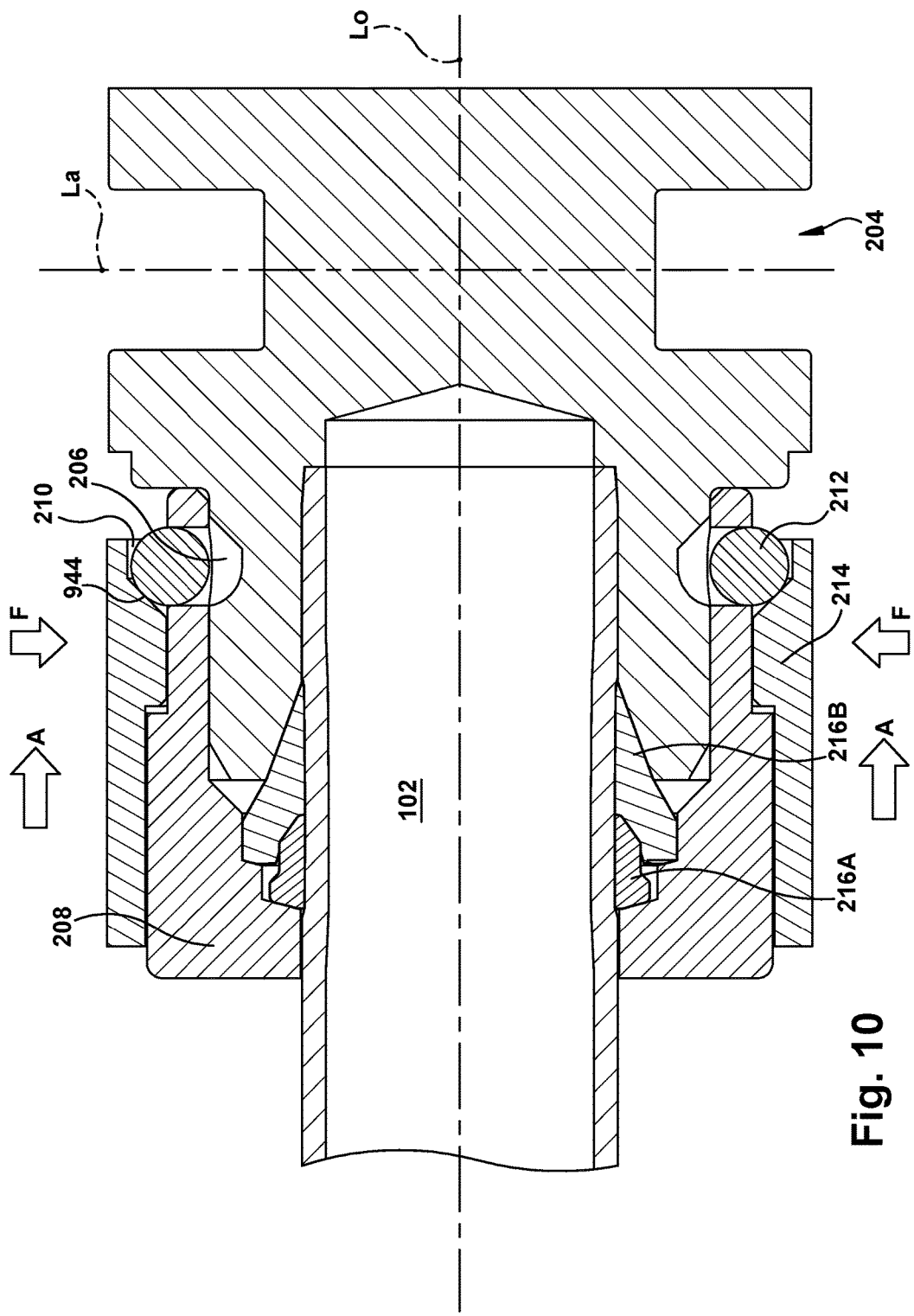
Figure 11:
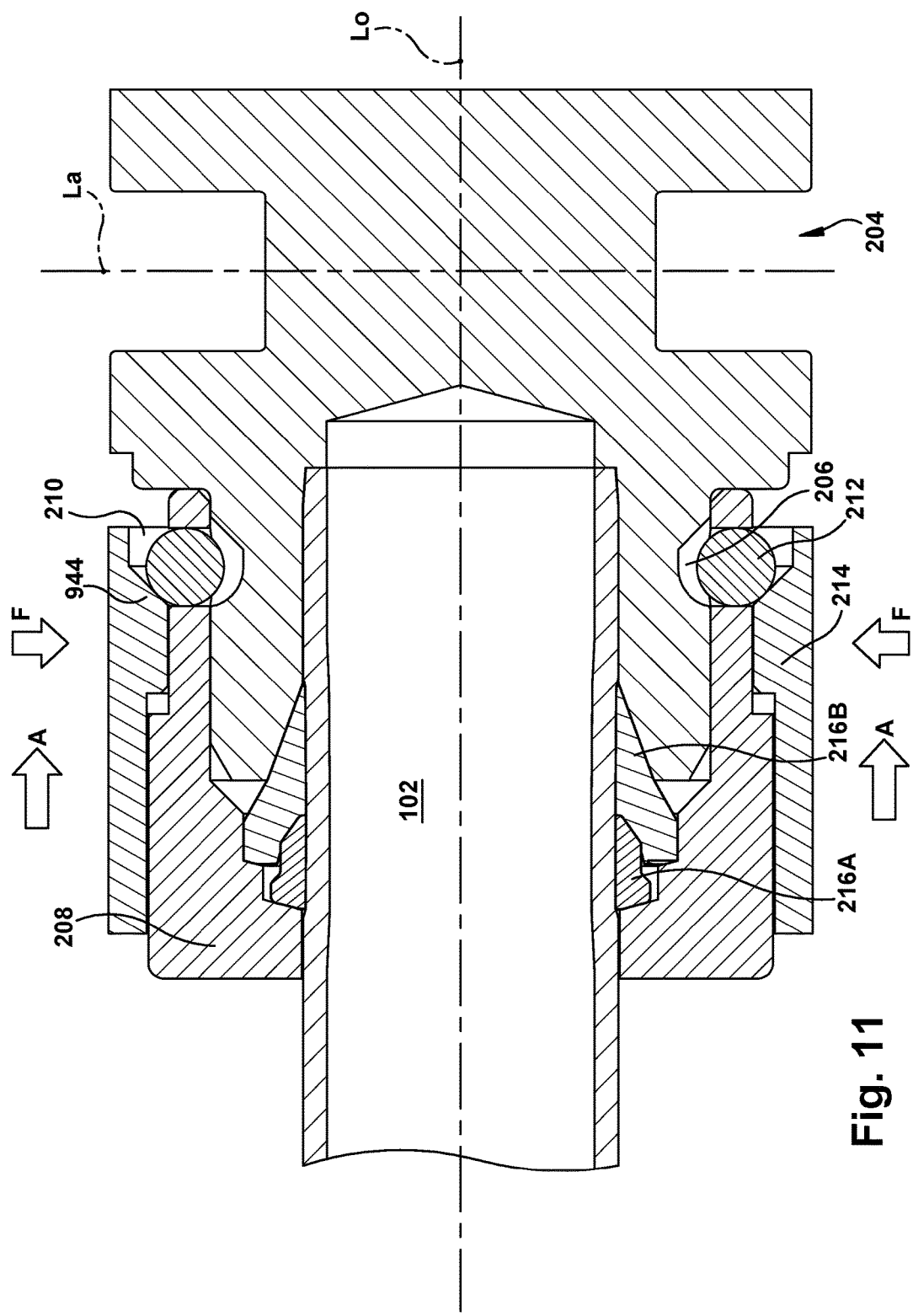

The interactions between the compression balls 212 and the body and retainer compression ball cavities 206 and 210 may occur as shown especially in FIGS. 9-11, where at least one setting surface 944 is provided to assist with achieving desired interactions between these structures. To with, and as shown in the sequence of FIGS. 9-10, the combination of the collar 214 and a retainer compression ball cavity 210 helps to position and retain each compression ball 212 during assembly of the fitting 100. Once the various components reach the assembly status shown in FIG. 10, the compression balls 212 are longitudinally aligned with (i.e., in a position that is laterally coincidental with) both the body and retainer compression ball cavities 206 and 210. However, there is no force other than, potentially, gravity (depending upon the relative orientation of these structures) to cause the compression ball 212 to "drop" laterally inward into the body compression ball cavity 206.

As shown, then, in the sequence of FIGS. 10-12, the collar 214 is slid longitudinally toward the body 204, and the angled "front" portion of the setting surface 944 of the collar 214 impinges upon the compression balls 212 to push the compression balls 212 laterally inward toward their respective body compression ball cavities 210. The collar 214 then continues to move toward the body 204 and the longitudinal "central" portion of the setting surface 944 prevents the compression balls 212 from backing out of the body compression cavities, and also contributes to the predetermined compression force F.

With the predetermined compression force F, the at least one compression ball 212 is urged into a deformation contact with at least one of the body compression ball cavity 206 and the retainer compression ball cavity 210 to achieve the use configuration shown in FIG. 12, which can be characterized as "elastic strain preloading". Each ring 216A and/or 216B may be deformed into the tube 102, as shown, under the predetermined compression force F, as well, during installation of the fitting 100 into the use configuration. (The results of this "squeeze" upon the tube 102 are shown via the grooved/skived portions of the outer tube surface 142 shown in FIG. 12.) The compression balls 212 and other structures of the fitting 100 could be considered to be "pressure welded" into place to lock up the fitting 100 for permanent dwelling in the use configuration.

It is contemplated that the fitting 100 could be employed, in some use environments, for interconnecting the tube 102 to at least one other tube (shown schematically via dashed line 102' in FIG. 1). In this manner, the fitting 100 could be used to permanently swage two or more tubes into a straight connection, a tee connection, a plus connection, or in any other desired manner. For two-tube straight connection use environments, for example, the body 204 could (instead of having a blind cap at the front body rim 430) be substantially mirrored about the lateral line La shown in FIG. 1, and additional copies of the other components could be provided. This situation is shown schematically via dashed line fitting 100' in FIG. 1. Accordingly, for multi-tube connection use environments, the body 204 will laterally surround at least a portion of the other tube 102'. The body 204 will then include a first array of body compression ball cavities (shown as 206 in the Figures) spaced apart from a second array of body compression ball cavities (not shown). The retainer will be a first retainer 208, and the collar will be a first collar 214. The fitting 100, for a multi-tube use environment, will then include a second retainer including laterally spaced, concentrically extending, and oppositely facing second inner retainer and outer retainer surfaces. The second inner retainer surface includes at least one second retainer compression ball cavity. The second inner retainer surface is configured for contacting the outer body surface. A multi-tube fitting 100 will also include at least one second compression ball for location concurrently in both of the second body compression ball cavity and the second retainer compression ball cavity, and a second collar including laterally spaced, concentrically extending, and oppositely facing second inner collar and outer collar surfaces. The second inner collar surface is configured for contacting the second outer retainer surface. The second collar will selectively exert a predetermined compression force laterally inward toward the second outer tube surface. The predetermined compression force will deform the at least one second compression ball into at least one of the second body compression ball cavity and the second retainer compression ball cavity, and optionally into the elastic strain preload condition. One of ordinary skill in the art, with knowledge of the present invention, will be able to provide a suitable fitting 100 (and components thereof) to interconnect any desired number of tubes, in any three-dimensional relative arrangement with one another, for a particular swaging/connecting use environment.

It is also contemplated that a fitting 100 could be configured to provide at least one metal-to-metal seal with a tube 102, the seal having a temperature rating of not less than 538° C. (1000° F.) and a pressure rating of not less than 2070 kPa (300 psi). The fitting 100 could provide a permanent (i.e., not capable of being reversed or returned to the original condition) and nonseparable seal that can be used to join any type(s) of tubing or piping, including copper and stainless steel. The fitting 100 could have any suitable dimensions, as desired for a particular use environment. For example, for use with a tube 102 having an OD (taken laterally) of about 0.5", the fitting could have an OD (taken laterally) in the range of about 1.0-1.3" and a total longitudinal length in the range of about 1.0-1.3".

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An axial swaged fitting for permanently joining to a tube to achieve an elastic strain preload condition, the fitting comprising:
    an annular body including at least one body compression ball cavity, the body laterally surrounding at least a portion of the tube;
    an annular retainer including at least one retainer compression ball cavity, the retainer laterally surrounding at least a portion of the body;
    at least one compression ball located concurrently in both of the body compression ball cavity and the retainer compression ball cavity, the at least one compression ball being deformed into both the body and the retainer; and
    an annular collar laterally surrounding at least a portion of the retainer;
    wherein the collar selectively exerts a compression force laterally inward toward the tube, the compression force being operative to urge the at least one compression ball into a deformation contact with both of the body compression ball cavity and the retainer compression ball cavity to deform the ball, bringing the axial swaged fitting into the elastic strain preload condition.

2. The axial swaged fitting of claim 1, wherein the body, retainer, collar, and tube are arranged concentrically around a common longitudinal axis.

3. The axial swaged fitting of claim 1, wherein the at least one compression ball is made of a first material, the body and retainer are made of a second material, and the first material is harder than the second material.

4. The axial swaged fitting of claim 1, wherein the body and retainer are made of a second material, the collar is made of a third material, and the third material is harder than the second material.

5. The axial swaged fitting of claim 1, wherein the annular retainer includes a plurality of retainer compression ball cavities radially spaced within a selected lateral cross-section of the retainer.

6. The axial swaged fitting of claim 1, for interconnecting the tube to an other tube, wherein the body laterally surrounds at least a portion of the other tube, the body includes a first array of body compression ball cavities spaced apart from a second array of body compression ball cavities, the retainer is a first retainer, the collar is a first collar, and the fitting includes:
    a second annular retainer including at least one second retainer compression ball cavity, the second retainer laterally surrounding at least a portion of the body including the second array of body compression ball cavities;
    at least one second compression ball located concurrently in both of a selected second body compression ball cavity and the second retainer compression ball cavity, the second compression balls being deformed into both the body and the second retainer; and
    a second annular collar laterally surrounding at least a portion of the second retainer;
    wherein the second collar selectively exerts a compression force laterally inward toward the other tube, the compression force being operative to urge the at least one second compression ball into a deformation contact with both of the second body compression ball cavity and the second retainer compression ball cavity to deform the ball, bringing the axial swaged fitting into the elastic strain preload condition.

7. The axial swaged fitting of claim 1, including at least one annular ring located laterally between the tube and at least one of the body and the retainer, each ring being deformed into the tube under the compression force.

8. The axial swaged fitting of claim 1, wherein the compression force deforms at least one of the at least one compression ball, the body compression ball cavity, and the retainer compression ball cavity.

9. The axial swaged fitting of claim 1, wherein none of the body, retainer, and collar include screw threads.

10. An axial swaged fitting for permanently joining to a tube, the fitting comprising:
    a body including laterally spaced, concentrically extending, and oppositely facing inner body and outer body surfaces, the outer body surface including at least one body compression ball cavity, the inner body surface for contacting an outer tube surface of the tube;
    a retainer including laterally spaced, concentrically extending, and oppositely facing inner retainer and outer retainer surfaces, the inner retainer surface including at least one retainer compression ball cavity, the inner retainer surface for contacting the outer body surface;
    at least one compression ball for location concurrently in both of the body compression ball cavity and the retainer compression ball cavity; and
    a collar including laterally spaced, concentrically extending, and oppositely facing inner collar and outer collar surfaces, the inner collar surface for contacting the outer retainer surface;
    wherein the collar selectively exerts a compression force laterally inward toward the outer tube surface, the compression force being operative to deform the at least one compression ball into a deformation contact with both of the body compression ball cavity and the retainer compression ball cavity.

11. The axial swaged fitting of claim 10, wherein the body, retainer, collar, and tube are arranged concentrically around a common longitudinal axis.

12. The axial swaged fitting of claim 10, for interconnecting the tube to an other tube, wherein the body laterally surrounds at least a portion of the other tube, the body includes a first array of body compression ball cavities spaced apart from a second array of body compression ball cavities, the retainer is a first retainer, the collar is a first collar, and the fitting includes:
    a second retainer including laterally spaced, concentrically extending, and oppositely facing second inner retainer and outer retainer surfaces, the second inner retainer surface including at least one second retainer compression ball cavity, the second inner retainer surface for contacting the outer body surface;
    at least one second compression ball for location concurrently in both of the second body compression ball cavity and the second retainer compression ball cavity; and
    a second collar including laterally spaced, concentrically extending, and oppositely facing second inner collar and outer collar surfaces, the second inner collar surface for contacting the second outer retainer surface;
    wherein the second collar selectively exerts a compression force laterally inward toward the second outer tube surface, the compression force being operative to deform the at least one second compression ball into a deformation contact with both of the second body compression ball cavity and the second retainer compression ball cavity.

13. The axial swaged fitting of claim 10, including at least one annular ring located laterally between the tube and at least one of the body and the retainer, each ring being deformed into the tube under the compression force.

14. The axial swaged fitting of claim 10, wherein none of the body, retainer, and collar include screw threads.

15. A method of permanently joining an axial swaged fitting to a tube to achieve an elastic strain preload condition, the method comprising:
    laterally surrounding a portion of the tube with an annular body including at least one body compression ball cavity;
    laterally surrounding at least a portion of the body with an annular retainer including at least one retainer compression ball cavity;
    bringing the body and retainer into at least partial lateral contact;
    locating a compression ball concurrently in both the body compression ball cavity and the retainer compression ball cavity;
    providing an annular collar;
    bringing the collar into at least partial lateral contact with the retainer;
    sliding the collar axially along the retainer;
    with the collar, exerting a compression force laterally inward toward the outer tube surface; and
    with the compression force, urging the at least one compression ball into a deformation contact with both of the body compression ball cavity and the retainer compression ball cavity to deform the ball, bringing the axial swaged fitting into the elastic strain preload condition.

16. The method of claim 15, wherein:
    laterally surrounding a portion of the tube with an annular body including at least one body compression ball cavity includes laterally surrounding a portion of the tube with a body including laterally spaced, concentrically extending, and oppositely facing inner body and outer body surfaces, the outer body surface including at least one body compression ball cavity;
    laterally surrounding at least a portion of the body with an annular retainer including at least one retainer compression ball cavity includes laterally surrounding at least a portion of the body with a retainer including laterally spaced, concentrically extending, and oppositely facing inner retainer and outer retainer surfaces, the inner retainer surface including at least one retainer compression ball cavity;
    bringing the body and retainer into at least partial lateral contact includes bringing the outer body surface and the inner retainer surface into at least partial lateral contact;
    providing an annular collar includes providing a collar including laterally spaced, concentrically extending, and oppositely facing inner collar and outer collar surfaces;
    bringing the collar into at least partial lateral contact with the retainer includes bringing the inner collar surface into at least partial lateral contact with the outer retainer surface; and
    sliding the collar axially along the retainer includes sliding the collar axially along the outer retainer surface.

17. The method of claim 15, including arranging the body, retainer, collar, and tube concentrically around a common longitudinal axis.

18. The method of claim 15, wherein sliding the collar axially along the retainer includes sliding the collar substantially axially along the retainer with no significant lateral motion of the collar with respect to the retainer.

19. The method of claim 15, including:
    providing at least one annular ring laterally between the tube and at least one of the body and the retainer; and deforming each ring into the tube under the compression force.

20. The method of claim 15, wherein sliding the collar axially along the retainer excludes bringing the collar into threaded engagement with any of the retainer, the tube, and the body.

* * * * *